Nov. 19, 1968 J. B. GODWIN 3,411,737
HELICOPTER
Filed Aug. 24, 1966 3 Sheets-Sheet 1
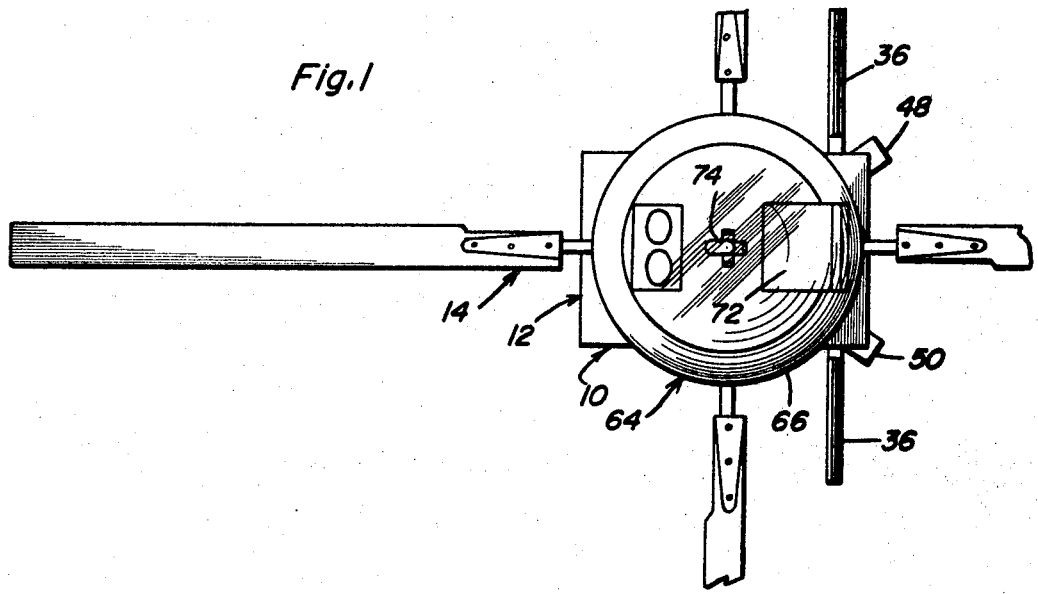
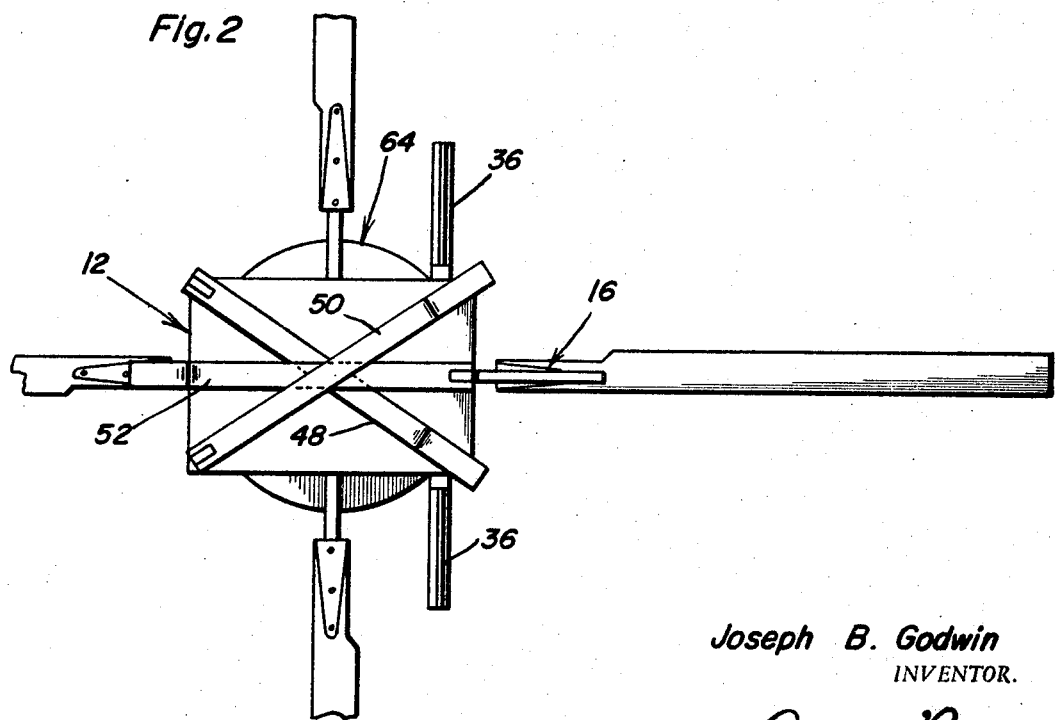
Joseph B. Godwin
INVENTOR.

Nov. 19, 1968     J. B. GODWIN     3,411,737
HELICOPTER
Filed Aug. 24, 1966     3 Sheets-Sheet 2
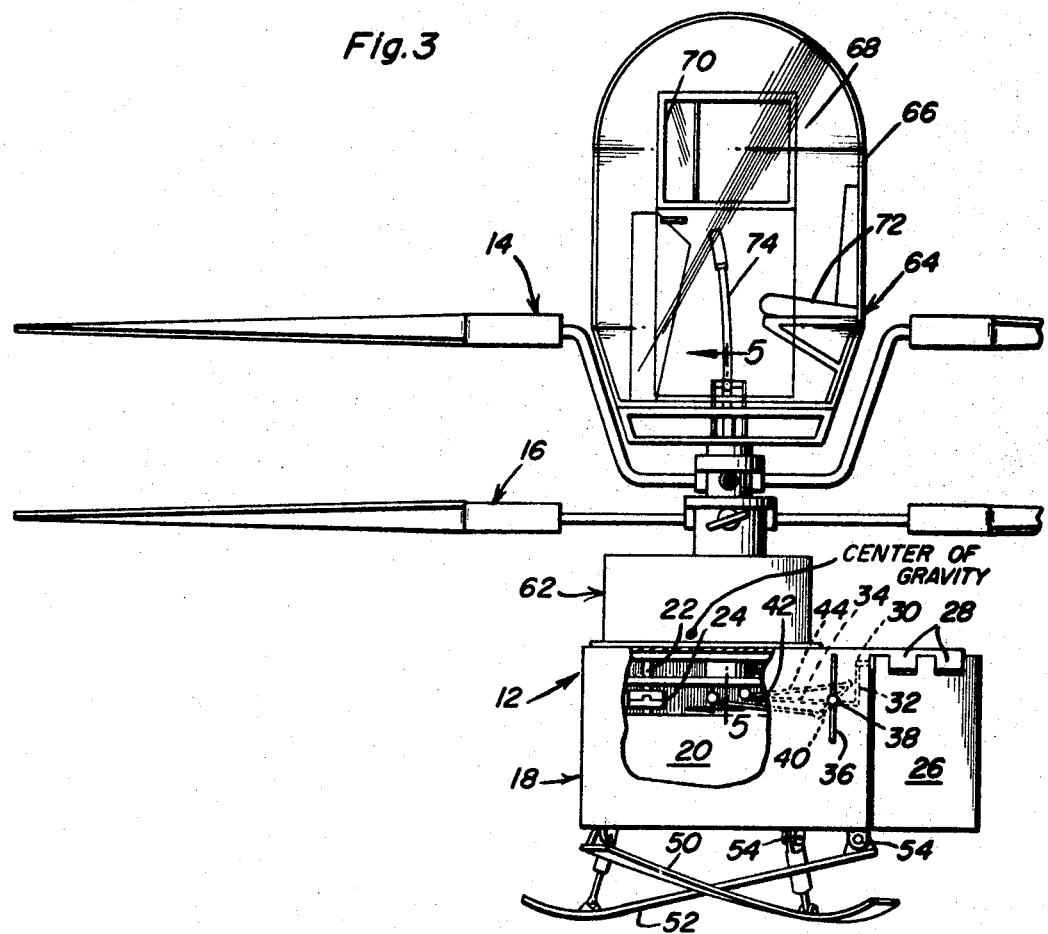
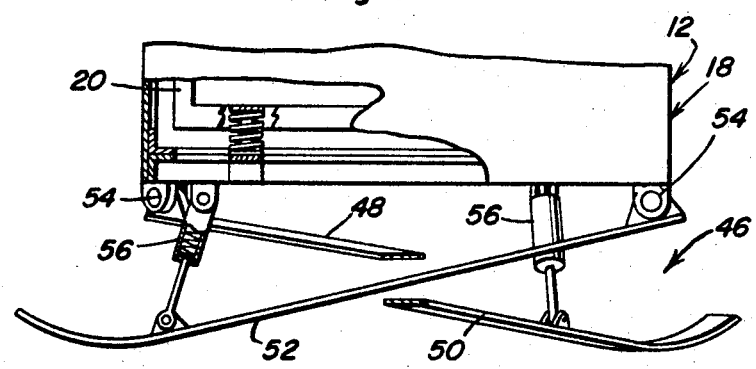
Joseph B. Godwin
INVENTOR.

Nov. 19, 1968   J. B. GODWIN   3,411,737
HELICOPTER
Filed Aug. 24, 1966   3 Sheets-Sheet 3
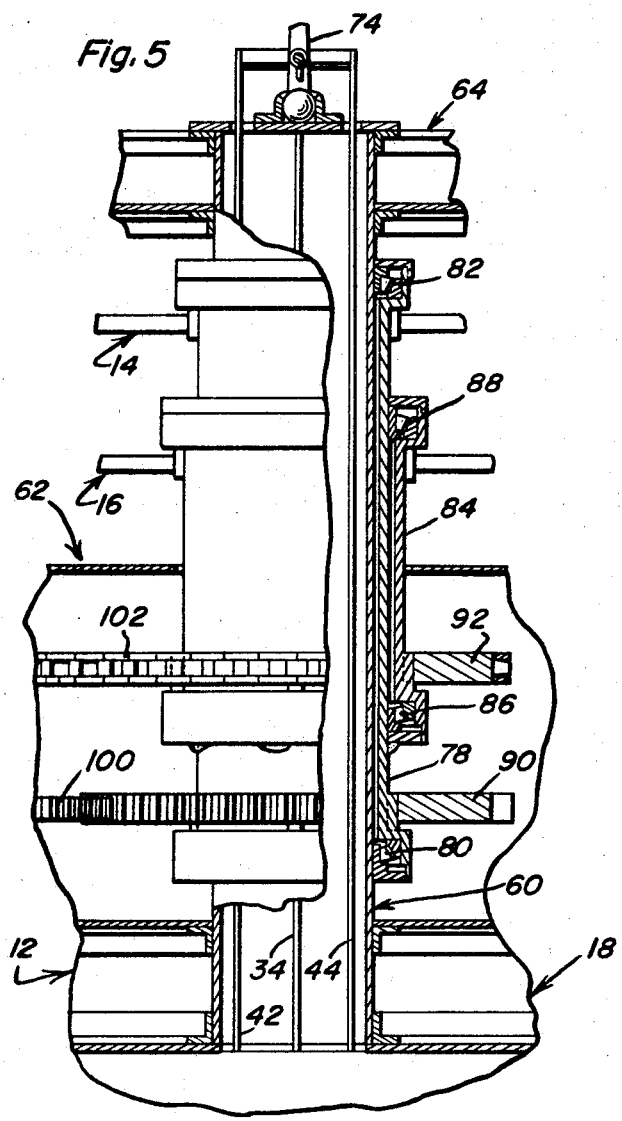
Fig. 5
Fig. 6
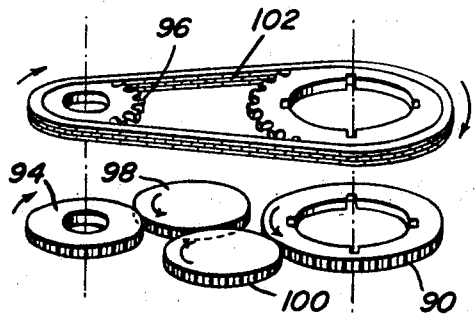
Joseph B. Godwin
INVENTOR.

United States Patent Office 3,411,737
Patented Nov. 19, 1968

3,411,737
HELICOPTER
Joseph B. Godwin, Hanford, Calif., assignor of fifty percent to Aubrey W. Price, Hanford, Calif.
Filed Aug. 24, 1966, Ser. No. 574,726
3 Claims. (Cl. 244—17.19)

ABSTRACT OF THE DISCLOSURE

A helicopter including a stationary upstanding tubular support extending between a pilot compartment supported at its upper end and an engine compartment supported at its lower end, the tubular support having external concentric sleeve members journaled thereon from which rotary wing means are supported and which are driven from motor means contained within the engine compartment. The lower engine compartment defines the body of the helicopter and includes movable stabilizer and rudder control surface defining members while the pilot's compartment supported at the top of the tubular support includes control means for moving the stabilizer and rudder controls and motion transmitting means extending through the tubular stationary support are provided to operatively connect the control means to the stabilizer and rudder means.

---

This invention relates to a novel and useful helicopter and more specifically to a helicopter including novel arrangement or relative positioning of the engine, rotary wing portions and pilot's compartment. In addition, the helicopter of the instant invention includes inherent structural and operating features adapting the helicopter to be easy to control in attitude and direction of flight.

In addition, the helicopter of the instant invention has its major components positioned relative to each other so as to afford the pilot of the helicopter unobstructed view in all directions other than vertically downwardly and to place the outer ends of the rotary wing portions of the helicopter slightly below eye level of the operator of the helicopter whereby the operator, when landing, may simultaneously view the ground and the clearance between any objects supported from the ground and the tips of the rotary wing portions of the helicopter.

The main object of this invention is to provide a helicopter designed to carry one or two persons and constructed in a manner whereby the attitude and direction of flight of the helicopter may be readily controlled.

Another object of this invention is to provide a helicopter including novel control characteristics whereby forward movement of the helicopter will automatically tend to downwardly incline the front of the helicopter thereby enabling the incline of the helicopter to more efficiently cause its forward movement through the air.

A still further object of this invention is to provide a helicopter whose basic components are relatively positioned in a manner to afford the operator of the helicopter maximum vision while flying and also while landing.

A final object of this invention to be specifically enumerated herein is to provide a helicopter in accordance with the preceding objects which will conform to conventional forms of manufacture, be of simple construction and easy to fly so as to provide a helicopter that will be economically feasible, long lasting and operable by a large majority of the populace with a minimum amount of training.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary top plan view of the helicopter of the instant invention;

FIGURE 2 is a fragmentary bottom plan view of the helicopter;

FIGURE 3 is a fragmentary side elevational view of the helicopter;

FIGURE 4 is an enlarged side elevational view of the lower portion of the engine housing portion of the helicopter from which the landing gear assembly is dependingly supported and with portions of the engine housing structure being broken away and illustrated in vertical section;

FIGURE 5 is an enlarged fragmentary side elevational view of the tubular component connecting the pilot's compartment and the engine housing compartment of the helicopter and illustrating the manner in which the contra-rotating rotary wing assemblies of the helicopter are journaled from the tubular member; and FIGURE 6 is a schematic perspective view of the drive assembly drivingly connecting the power output shaft of the engine of the helicopter to the contra-rotating rotary wing assemblies of the helicopter.

Referring now more specifically to the drawings, the numeral 10 generally designates the helicopter of the instant invention, including a body assembly generally referred to by the reference numeral 12 and contra-rotating upper and lower rotary wing assemblies generally referred to by the reference numerals 14 and 16.

The body assembly 12 includes a main body portion generally referred to by the reference numeral 18 and which encloses an engine 20 including a power output shaft 22 provided with a clutch mechanism 24. The main body portion 18 has pivotally supported from its rear side an outwardly projecting rudder 26 mounted on a pivot shaft rotatably received through journals 28. The pivot shaft 30 projects inwardly of the main body portion 18 and has an operating lever 32 connected thereto for actuation by a suitable control actuator 34. In addition, the main body portion 18 includes a pair of opposite side pivoted stabilizer members 36 mounted on pivot shafts 38 also projecting inwardly of the main body portion 18 and having control levers 40 operatively connected thereto for actuation by suitable control actuators 42 and 44. The stabilizers or ailerons 36 operate in a unique manner to be hereinafter more fully set forth and the control actuators 34, 42 and 44 for the rudder 26 and for the ailerons 36 may be readily controlled.

The main body portion 18 includes a landing gear assembly generally referred to by the reference numeral 46 including a plurality of crossed ski-like members 48, 50 and 52 pivotally supported from the main body portion 18 at one set of corresponding ends as at 54 and having shock absorber members 56 secured between the main body portion 18 and the ends of the ski-like members 52 remote from their pivotal connections with the main body portion 18.

A main tubular support generally referred to by the reference numeral 60 projects upwardly from the main body portion 12 and through a drive assembly housing 62 supported from the upper portion of the main body portion 18. A passenger and pilot supporting assembly generally referred to by the reference numeral 64 is provided and secured to the upper end of the tubular support 60 whereby the assembly 64 is rigidly supported from the assembly 12. The passenger and pilot support assembly 64 includes an enclosure 66 provided with an entrance and exit opening 68 closable by means of a hinged door 70 and the interior of the enclosure 66 includes seat means 72 and a movable control member 74 readily engageable by a pilot seated upon the seat means 72 and which is operatively connected to the control actuators 34, 42 and 44.

A long inner drive sleeve 78 is journaled on the tubular support by means of suitable bearing assemblies 80 and 82 and a short outer sleeve 84 is journaled on the inner sleeve 78 by means of suitable bearings 86 and 88. The rotary wing assembly 14 is supported from the inner sleeve 78 and the rotary wing assembly 16 is supported from the outer sleeve 84.

The sleeve 78 has a large gear wheel 90 mounted thereon and the sleeve 84 has a large sprocket wheel 92 mounted thereon. The output shaft 22 projects upwardly into the drive assembly housing 62 and has mounted thereon a drive wheel 94 and a drive sprocket 96. The drive wheel is drivingly engaged with the gear wheel 90 through a pair of additional gears 98 and 100 also journaled within the drive assembly housing 62, the drive wheel 94 being meshed with the gear 98, the gear 98 being meshed with the gear 100, and the gear 100 being meshed with the gear wheel 90.

The drive sprocket 96 is aligned with the sprocket wheel 92 and drivingly connected to the latter by means of an endless drive member 102. Accordingly, it will be noted that the sleeves 78 and 84 are driven at the same rotational speed from the output shaft 22 and in opposite directions of rotation. Therefore, the rotary wing assembles 14 and 16 will rotate at the same speed but in opposite directions.

In operation, a downward flow of air past the ailerons 36, when the latter are rearwardly and upwardly inclined, will cause the upper portion of the helicopter 10 to tilt forwardly and thus effect forward movement of the helicopter 10.

As forward movement of the helicopter 10 increases in velocity, the ailerons 36 may be returned to the positions thereof illustrated in FIGURE 3 inasmuch as the drag of the air impinging thereon effected by forward movement of the helicopter 10 will be sufficient to maintain the latter in a forwardly inclined position. Actually, if the forward speed of the helicopter 10 exceeds a predetermined velocity, the drag on the ailerons 36 will be overly excessive and thus it will become necessary to rotate the ailerons 36 to a forwardly and upwardly inclined position so as to reduce the air drag thereon. However, once the desired forward speed of the helicopter 10 has been realized, the aileron controls need not be changed except for sudden maneuvers of the helicopter 10.

Downward movement of air past the rudder 26 when the lower end of the latter is pivoted outwardly toward one side of the body assembly 12 will cause the rear end of the body assembly 12 to pivot toward the other side thereof and thus control the horizontal direction in which the helicopter 10 is facing. Accordingly, it may be seen that gradual turns of the helicopter 10 while moving forwardly may be readily accomplished merely by slightly changing the positioning of the rudder 26 until the desired heading is obtained and then returning the rudder 26 to its normal position. Of course, the helicopter 10 may also move in a reverse direction by initiating horizontal flight by shifting the ailerons 36 so that they are forwardly and upwardly inclined. Then, the air forced downwardly therepast will cause the body assembly 12 to swing forwardly thus including the helicopter rearwardly. The rotary wing assemblies are obivously disposed above the center of gravity of the helicopter and it will be noted that the blades of the assembly 14 are upwardly offset relative to the inner sleeve 78.

What is claimed as new is as follows:

1. A helicopter including a body having front and rear portions as well as opposite side portions, a stationary upstanding tubular support carried by said body and projecting outwardly therefrom, a pair of concentric upstanding inner and outer sleeves journaled on said support intermediate the upper and lower ends thereof and disposed exteriorly of said support, vertically spaced first and second rotary wing means carried by said sleeves for rotation therewith relative to said support, motor means supported from and at least partially enclosed within said body and drivingly connected to said sleeves for rotating the latter in opposite directions, a passenger and pilot supporting assembly mounted on said support above said sleeves, the center of gravity of said helicopter being disposed forwardly of the axes of rotation of said sleeves and below said rotary wing means, said body including upstanding stabilizer means equilaterally disposed relative to the center longitudinal axis of said body and hingedly supported from the latter for controlled oscillation about a generally horizontal axis extending transversely of said body and disposed rearwardly of the axes of rotation of said sleeves, said stabilizer means being disposed below said rotary wing means, upstanding rudder means on said body disposed below said rotary wing means pivotally supported for controlled oscillation about a horizontal axis extending longitudinally of said body, said rudder means being spaced rearwardly from the axes of rotation of said sleeves, movable control means disposed in said passenger and pilot supporting assembly, and motion transmitting connecting means operatively connecting said control means to said stabilizer and rudder means for control of the latter from said passenger and pilot supporting assembly, said motion transmitting means including portions thereof extending through said tubular support.

2. The combination of claim 1 wherein said body includes a lower portion, said lower portion including resiliently suspended horizontally spaced apart ground engaging support means spaced vertically below said lower portion.

3. The combination of claim 2 wherein said support means includes three inclined elongated support members extending generally longitudinally of said body, the upper ends of one pair of said elongated support members being pivotally supported from one end portion of said lower portion for rotation about a horizontal axis extending transversely of said body and the free ends of said support members being inclined downwardly toward the other end of said body and being adapted for engagement with the ground, one end portion of the third elongated member being pivotally supported to the other end portion of said lower portion for rotation about a horizontal axis extending transversely of said body and the free end of said third elongated member being inclined downwardly and toward said one end portion of said lower portion and adapted for engagement with the ground, means operatively connected between said lower portion and said free ends yieldingly resisting upward movement of said free ends.

References Cited

UNITED STATES PATENTS

| 1,527,666 | 2/1925 | Berliner | 244—17.19 |
| 1,849,235 | 3/1932 | Kibbe | 244—17.19 |
| 2,847,173 | 8/1958 | McCarty | 244—17.11 |
| 2,936,971 | 5/1960 | Holmes | 244—17.21 |
| 3,173,632 | 3/1965 | Woods | 244—17.17 XR |

FOREIGN PATENTS

| 1,256,015 | 2/1961 | France. |
| 1,356,307 | 2/1963 | France. |
| 248,065 | 2/1926 | Great Britain. |
| 755,629 | 8/1956 | Great Britain. |
| 600,986 | 12/1959 | Italy. |

MILTON BUCHLER, *Primary Examiner.*

P. E. SAUBERER, *Assistant Examiner.*